MONITORING DEVICE FOR DISTINGUISHING BETWEEN VOICE AND DATA SIGNALS

Filed Aug. 22, 1966

INVENTOR
JOEL S. ENGEL
BY *[signature]*
ATTORNEY 3,448,215
Patented June 3, 1969

3,448,215

MONITORING DEVICE FOR DISTINGUISHING BETWEEN VOICE AND DATA SIGNALS

Joel E. Engel, Bethesda, Md., assignor to Northrop Corporation, Beverly Hills, Calif., a corporation of California Filed Aug. 22, 1966, Ser. No. 574,197
Int. Cl. H04m *1/00*
U.S. Cl. 179—1 8 Claims

ABSTRACT OF THE DISCLOSURE

A communication channel is monitored for the presence of either voice or data signals by detecting both signal presence and signal interruption. The output of both is used to trigger a flip-flop to an output indicating data, while the absence of signal interruption will trigger the flip-flop to its other output indicating voice.

Figure 1:
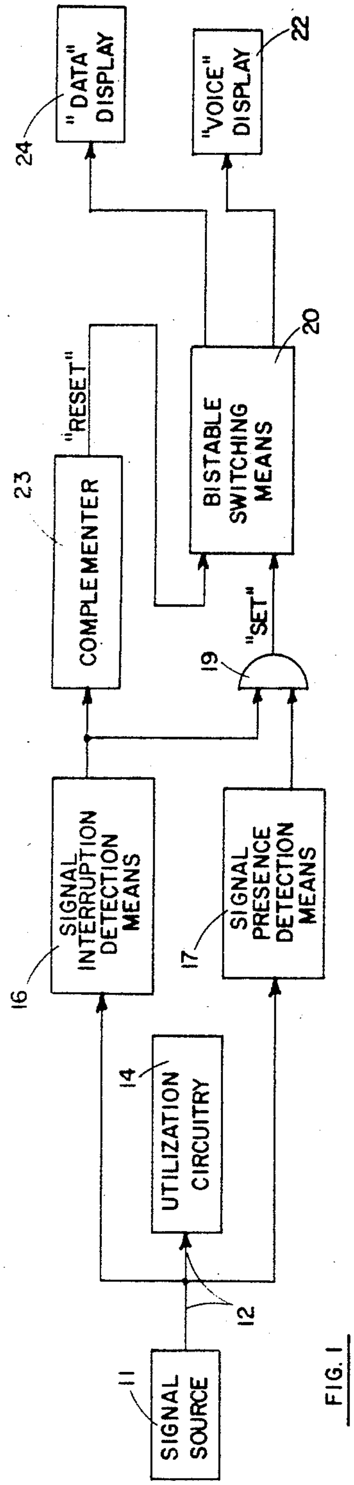

This invention relates to a monitoring device for distinguishing between voice and data signals, and more particularly to such a device capable of continuously monitoring a communications channel and generating a signal indicative of whether voice or data information is present on the channel.

In communications operations it is often important to ascertain what type of information is being transmitted on any particular channel to provide an immediate indication of such condition and/or to make a recording of the utilization of the channel for future reference. Techniques and devices of the prior art for monitoring communication channels for this purpose either have relied for their operation on specialized conditions which limit their use to certain specific situations or require manual operation which lacks the continual monitoring to be desired.

The device of this invention provides means for continually and automatically monitoring a communications channel to provide rapid indication as to whether voice or data signals or no signals at all are present on the channel. The indication signals are in a form suitable for immediate display, for controlling a switch to initiate any desired reactions, or for recording for reference at a later time. The circuitry involved is of relatively simple and economical construction and capable of highly reliable operation.

The device of the invention bases its operation on the fact that voice communications signals comprise bursts of speech having silent periods interspersed therebetween, while data signals are continuous, even when information is not being generated. The device, to operate effectively, further must be able to distinguish between significant breaks in data or voice transmission and the normal interruptions between bursts of speech. Averaging circuits, with appropriate time constants, are provided to make this distinction.

In accomplishing the desired end results, the device of the invention utilizes signal interruption detection means connected to the channel to be monitored for generating an output signal when there is an absence of signal on the channel for greater than a predetermined fraction of a preset time interval. Signal presence detection means is connected to the channel to be monitored to generate an output signal when either data or voice signals are present. Bistable switching means are provided to alternatively actuate either a data display or a voice display, such switching means being actuated to provide a data display when there is no output from the signal interruption detection means, indicative of the presence of data signals, and to provide a voice display in response to a logical gating device when there is simultaneously an output both from the signal presence detection means and the signal interruption detection means.

It is therefore an object of this invention to provide a simple yet highly effective device for monitoring a communications channel to furnish a continual indication as to the nature of the information on such channel.

It is a further object of this invention to facilitate the monitoring of communications channels.

It is still another object of this invention to provide means for automatically generating a signal indicative as to whether voice or data information is present on a channel.

It is still a further object of this invention to provide means for accurately determining the relative utilization of a communications line for data and voice signals.

Figure 2:
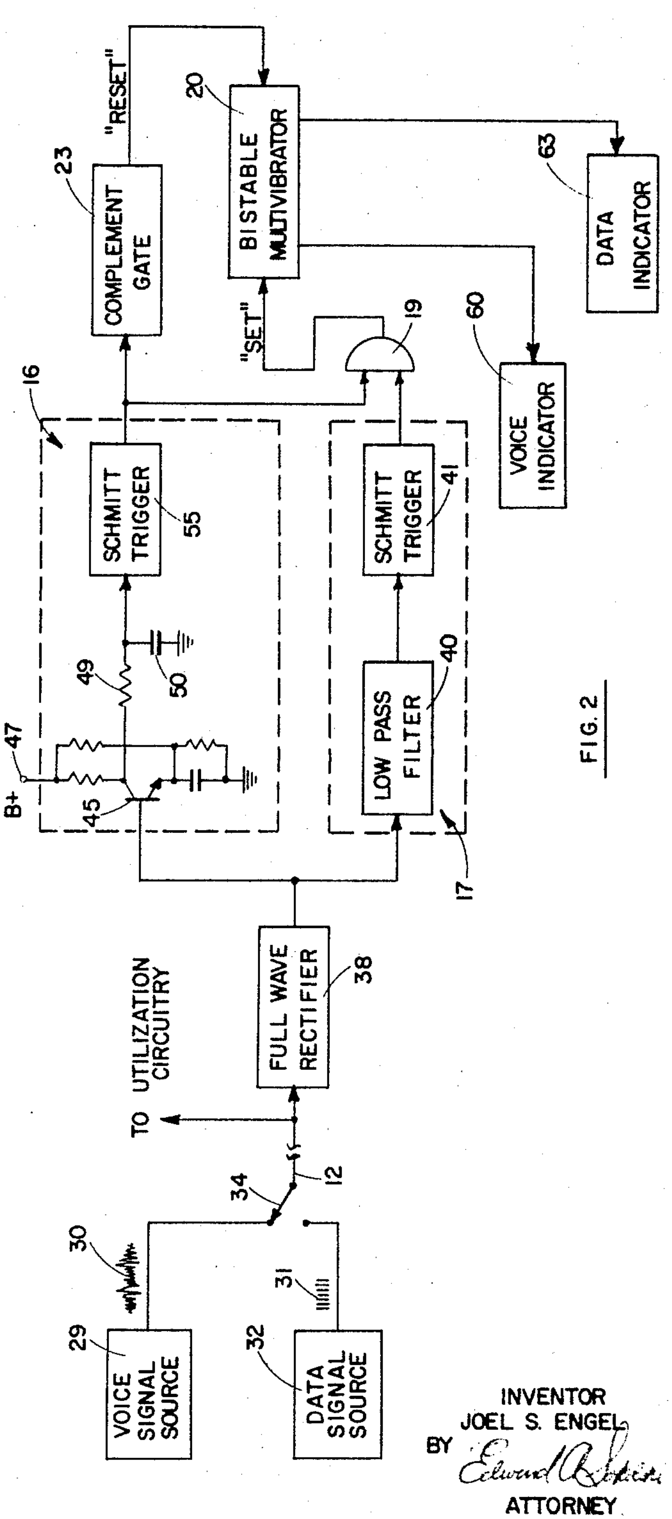

Other objects of this invention will become apparent from the following description taken in connection with the accompanying drawings, of which:

FIG. 1 is a block diagram illustrating the basic operation of the device of the invention, and FIG. 2 is a functional schematic drawing of a preferred embodiment of the device of the invention.

Referring now to FIG. 1, the basic operation of the device of the invention is illustrated. Signals are fed from signal source 11 on communications channel 12 to utilization circuitry 14 which may comprise receivers, data processing equipment, etc. Connected to receive any signals which may be present on channel 12 are signal interruption detection means 16 and signal presence detection means 17. Signal interruption detection means 16, as to be explained fully in connection with FIG. 2, comprises circuitry for generating an output signal when there is an interruption of signals on channel 12 for greater than a predetermined fraction of the time. Signal presence detection means 17 generates an output signal whenever there are any signals present on the channel. The outputs of signal interruption detection means 16 and signal presence detection means 17 are both fed to AND gate 19. AND gate 19 will thus generate an output signal when both signal presence detection means 17 and signal interruption detection means 16 are generating output signals, such being the case only when there is a signal present on channel 12 and such signal has interruptions therein which exceed a pre-determined fraction of the time. These conditions are satisfied when voice signals are present on the channel, such signals generating an average signal output from signal presence detection means 17 and with sufficient interruptions among speech bursts to generate an output from signal interruption detection means 16.

The output of AND gate 19 is fed to bistable switching means 20 and with both inputs to this gate simultaneously present, switching means 20 is actuated to in turn actuate voice display 22.

The output of signal interruption detection means 16 is also fed to complementer 23 which generates an output signal to bistable switching means 20 when there is a "zero" output from the signal interruption detection means 16. Such "zero" output is indicative of the presence of data signals on channel 12, and thus, under such conditions, bistable switching means 20 is actuated to in turn actuate "data" display 24.

In this fashion, data information is distinguished from voice information with a continuous display being generated indicative of which type of information is present on the channel. Data display 24 and voice display 22 may comprise indicator devices such as pilot lamps, a recording device such as a pen recorder, or both. The output of bistable switching means 20 may also be used to accomplish control functions such as the switching of the signals onto one line or another depending on the nature of such signals.

Referring now to FIG. 2, a functional schematic drawing of a preferred embodiment of the device of the invention is illustrated. Voice signals 30 generated by voice signal sources 29, or data signals 31, generated by data signal source 32, may alternatively be fed to line 12 through switch 34. The voice signals 30, as can be seen, comprise bursts of transmission separated by short intervals, while the data signals 31 are steady and continuous. One or the other type of signal is fed on channel 12, which may comprise a telephone line, to suitable utilization circuitry (not shown) on the receiving end.

The signals on the line are also fed to the monitoring circuit of the device of the invention which operates as follows: The signals are first rectified by means of full wave rectifier 38 to produce a D-C signal proportional to the absolute value of the signal on the line. The output of full wave rectifier 38 is fed to low pass filter 40 of signal presence detection means 17. Low pass filter 40 filters the signal so as to produce a D-C output in accordance with the RMS value of the signal on the line. The output of low pass filter 40 is fed to Schmitt trigger circuit 41. Schmitt trigger 41 is biased so that it generates an output signal to AND gate 19 whenever there is a signal output from low pass filter 40 which is greater than a predetermined magnitude, indicating the presence of a signal on line 12.

The output of rectifier 38 is also fed to the base of transistor 45, which is connected in a hard limiting inverter circuit. Transistor 45 is biased at the threshold of conduction such that when the signal at its base is close to zero, the transistor is at cutoff and the voltage at its collector is substantially the same as the supply voltage supplied to terminal 47. Under such conditions the full supply voltage is supplied to the R-C integrating circuit comprising resistor 49 and capacitor 50. When, however, there is any significant positive signal input at the base of transistor 45, the transistor is driven into heavy conduction and its collector voltage drops to close to ground potential. Under such conditions, no charging potential is applied across capacitor 50.

The time constant of the integrator circuit comprising resistor 49 and capacitor 50 is relatively long, and the voltage developed across capacitor 50 is proportional to the fraction of the time that the input to transistor 45 is substantially zero and this transistor is at cutoff. Schmitt trigger circuit 55 is biased so that it will fire when the voltage across capacitor 50 reaches a predetermined value corresponding to interruptions in the signal on line 12 indicative of either speech on such line or a break in the transmissions.

The output of Schmitt trigger 55 is fed to AND gate 19. AND gate 19, as already indicated, also receives the output of Schmitt trigger 41. When both Schmitt trigger 41 has an output (indicating the presence of any signal on the line) and Schmitt trigger 55 has an output (indicating predetermined silence periods on the line), AND gate 19 will have a "TRUE" output which will drive the "set" stage of bistable multivibrator 20 such that the output of this multivibrator actuates voice indicator 60. Such simultaneous inputs to AND gate 19 obviously cannot occur when there is a complete break in the transmission and therefore will be present only when there are brief interruptions as in the case of voice signals. The firing of Schmitt trigger 41 and Schmitt trigger 55 can of course be adjusted as desired by appropriate bias controls to provide the desired operating criteria.

When Schmitt trigger 55 is in its unfired state, which will be the case when the ratio of the silent periods to the transmission periods is less than the predetermined value, complement gate 23 will be actuated to pass a signal through to bistable multivibrator 20 to actuate the "reset" state of this multivibrator. When this "reset" stage is actuated, the "set" stage which has been actuating voice indicator 60 is driven to its opposite state and so deactutaes the voice indicator. Simultaneously, data indicator 63 is actuated by the "reset" stage. Thus it can be seen that the presence of data on the line will prevent the firing of Schmitt trigger 55 and thereby will cause the actuation of the data indicator. Complement gate 23 may comprise a conventional diode or transistor gating circuit connected to Schmitt trigger 55 to provide the necessary drive signal to actuate the "reset" stage of bistable multivibrator 20 when Schmitt trigger 55 is in its unfired state.

The outputs of multivibrator 20, if so desired, may also be utilized as input signals to a recorder to provide a record of the relative utilization of the channel by voice and data transmissions, or could be implemented to provide a switching control signal for switching data signals to one particular line and voice signals to another line.

It is to be noted that multivibrator 20 once actuated to the "set" condition by an output from AND gate 19 remains in this condition until a "reset" signal arrives from complement gate 23 and then remains in the "reset" condition until a "set" signal arrives. Thus, during breaks in transmission, the output of the multivibrator will indicate the last type of signal present on the line. An interruption in the data flow, thus, will not trigger a "voice" indication and vice versa.

The device of this invention thus provides simple yet highly effective means for continually monitoring a communications channel to provide a signal indicating whether data or voice information is on the channel.

While the device of the invention has been described and illustrated in detail it is to be clearly understood that this is intended by way of illustration and example only and is not to be taken by way of limitation, the spirit and scope of this invention being limited only by the terms of the following claims.

I claim:

1. In a communications channel monitoring device, a signal source, the output of said signal source being fed to said channel, means for determining whether there are voice or data signals on said channel comprising signal presence detection means connected to said channel for generating a predetermined output whenever there are either voice or data signals on said channel, signal interruption detection means connected to said channel for generating a predetermined output when there are interruptions in the signals on said channel for greater than a predetermined fraction of the time, gating means responsively connected to said signal presence detection means and said signal interruption detection means for generating an output when there are outputs simultaneously present from both of said detection means, bistable switching means having "set" and "reset" input controls and outputs corresponding to each of said controls, means responsive to said signal interruption detection means for providing an actuation signal to one of the input controls of said bistable switching means when said signal interruption detection means output is not present, means for coupling the output of said gating means to the other of the input controls of said bistable switching means, and display means responsively connected to the outputs of said bistable switching means for indicating the presence of voice and data signals on said channels.

2. The device as recited in claim 1 wherein said gating means comprises an AND gate.

3. The device as recited in claim 1 wherein said signal interruption detection means comprises an electronic amplifier biased at the threshold of conduction, integrating means for integrating the output of said amplifier and trigger generator means for generating a trigger pulse when the output of said integrating means exceeds a predetermined magnitude.

4. The device as recited in claim 1 wherein said means for providing an actuation signal to one of the input controls of said bistable switching means comprises a complement gate.

5. In a communications channel monitoring device, a signal source, the output of said signal source being fed to said channel, means for determining whether there are voice or data signals on said channel comprising signal presence detection means connected to said channel for generating a predetermined output whenever there are either voice or data signals on said channel, signal interruption detection means connected to said channel for generating a predetermined output when there are interruptions in the signals on said channel for greater than a predetermined fraction of the time, AND gate means responsively connected to said signal presence detection means and said signal interruption detection means for generating an output when there are outputs simultaneously present from both of said detection means, complementer means connected to said signal interruption detection means for generating a predetermined output when said signal interruption detection means output is not present, bistable switching means having "set" and "reset" input controls and outputs corresponding to each of said controls, the output of said complementer means being fed to one of said input controls, the output of said AND gate being fed to the other of said input controls, data display means for indicating the presence of data signals on said channel connected to the switching means output associated with the input control receiving said complementer means output, and voice display means for indicating the presence of voice signals on said channel connected to the other of said switching means outputs.

6. The device as recited in claim 5 wherein said signal interruption detection means comprises electronic amplifier means biased at the threshold of conduction, integrating means for integrating the output of said amplifier means and means responsive to said integrating means output for generating a trigger signal whenever said integrating means output exceeds a predetermined value.

7. The device as recited in claim 6 wherein said means for generating a trigger signal comprises a Schmitt trigger.

8. The device as recited in claim 5 wherein said bistable switching means comprises a bistable multivibrator.

References Cited

UNITED STATES PATENTS

| | | | |
|---|---|---|---|
| 3,315,246 | 4/1967 | Huffman et al. | 328—120 |
| 3,071,723 | 1/1963 | Gabor | 328—120 |
| 3,026,383 | 4/1962 | Englander | 179—1 |
| 2,985,828 | 5/1961 | Mason | 328—109 |

OTHER REFERENCES

"Music Pulse Analyzer," by Ronald L. Ives, Electronics, April 1957, pp. 183–185.

KATHLEEN H. CLAFFY, *Primary Examiner.*

ROBERT P. TAYLOR, *Assistant Examiner.*

U.S. Cl. X.R.

328—109